United States Patent
Chen et al.

(10) Patent No.: US 10,038,513 B2
(45) Date of Patent: Jul. 31, 2018

(54) BIT ALLOCATION METHOD AND APPARATUS FOR MULTICARRIER MODULATION SIGNAL, AND SYSTEM

(71) Applicant: FUJITSU LIMITED, Kawasaki-shi, Kanagawa (JP)

(72) Inventors: Hao Chen, Beijing (CN); Lei Li, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 254 days.

(21) Appl. No.: 15/007,868

(22) Filed: Jan. 27, 2016

(65) Prior Publication Data

US 2016/0226613 A1   Aug. 4, 2016

(30) Foreign Application Priority Data

Jan. 30, 2015   (CN) .......................... 2015 1 0050257

(51) Int. Cl.
| | |
|---|---|
| *H04L 12/50* | (2006.01) |
| *H04J 11/00* | (2006.01) |
| *H04L 27/26* | (2006.01) |
| *H04L 5/00* | (2006.01) |
| *H04W 52/24* | (2009.01) |
| *H04W 52/34* | (2009.01) |

(52) U.S. Cl.
CPC ........ *H04J 11/0026* (2013.01); *H04L 5/0046* (2013.01); *H04L 27/2614* (2013.01); *H04W 52/241* (2013.01); *H04W 52/346* (2013.01); *H04L 27/2623* (2013.01)

(58) Field of Classification Search
CPC ........................................................ H04J 5/04
USPC ........................................................ 370/212
See application file for complete search history.

(56) References Cited

U.S. PATENT DOCUMENTS

| | | | |
|---|---|---|---|
| 6,798,735 B1 * | 9/2004 | Tzannes ............... | H04W 72/04 370/207 |
| 2015/0333940 A1 * | 11/2015 | Shokrollahi ........ | H04L 25/0272 375/296 |

OTHER PUBLICATIONS

Chow et. al., "A Practical Discrete Multitone Transceiver Loading Algorithm for Data Transmission over Spectrally Shaped Channels", *IEEE Transactions on Communications*, vol. 43, No. 2/3/4, 1995, pp. 773-775.

* cited by examiner

*Primary Examiner* — Dang Ton (74) *Attorney, Agent, or Firm* — Staas & Halsey LLP (57) ABSTRACT

A bit allocation method and apparatus for a multicarrier modulation signal and a system where the method includes: determining a signal to noise ratio margin according to a predefined probability of a maximum clipping noise that can be allowed by the system; and allocating the number of modulating bits and power in each subcarrier for a multicarrier modulation signal according to the signal to noise ratio margin. By presetting a signal to noise ratio margin for a clipping noise, tolerance of the signal for the clipping noise is increased, and bit error rate is efficiently lowered.

9 Claims, 6 Drawing Sheets

BIT ALLOCATION METHOD AND APPARATUS FOR MULTICARRIER MODULATION SIGNAL, AND SYSTEM

CROSS-REFERENCE TO RELATED APPLICATIONS

This application claims the benefit of Chinese Application No. 201510050257.2, filed Jan. 30, 2015, the disclosures of all of which are incorporated herein by reference.

BACKGROUND OF THE INVENTION

1. Field

The present disclosure relates to the field of communications, and in particular to a bit allocation method and apparatus for a multicarrier modulation signal, and a system.

2. Description of the Related Art

Multicarrier modulation employs multiple subcarrier signals. It decomposes a data stream into several sub-data streams, so that the sub-data stream has a much lower transmission rate, and these data are respectively used to modulate several subcarriers. A multicarrier modulation signal features in that transmission rate of the subcarrier data is relatively low and the periods of code elements are relatively long, etc. The multicarrier modulation may be achieved by multiple technical means, such as discrete multi-tone (DMT), and orthogonal frequency division multiplexing (OFDM), etc. Fast Fourier transform (FFT) is an effective method for achieving the multicarrier modulation.

A problem exists in a multicarrier modulation signal is that its peak to average power ratio (PAPR) is relatively high. In practical applications, a peak value of an output signal of a transmitter is usually limited. Hence, in order to increase average power of a signal, a PAPR of the signal needs to be lowered. One of the most frequently used methods is to directly perform clipping on the multicarrier modulation signal. The clipping method introduces signal distortion while lowering the PAPR and increasing the average power of the signal. And on the other hand, as a multicarrier modulation signal is formed by superimposing multiple subcarrier signals, in some special bit patterns, an extremely high PAPR will occur, and performing clipping on symbols of the extremely high PAPRs will produce large signal distortion, resulting in occurrence of a burst error in the symbols. Although a probability of occurrence of such a burst error is not high, which has quite small effect on the average bit error rate, such a burst error will cause invalidation of decoding of forward error correction (FEC), thereby resulting in communication failure.

It should be noted that the above description of the background art is merely provided for clear and complete explanation of the present disclosure and for easy understanding by those skilled in the art. And it should not be understood that the above technical solution is known to those skilled in the art as it is described in the background of the present disclosure.

SUMMARY

In order to solve these problems pointed out in the Background, embodiments of the present disclosure provide a bit allocation method and apparatus for a multicarrier modulation signal and a system, so as to reduce burst errors of the multicarrier modulation signal.

According to a first aspect of the embodiments of this application, there is provided a bit allocation method in a multicarrier communication system, including: determining a signal to noise ratio margin according to a predefined probability of a maximum clipping noise that can be allowed by the system; and allocating the number of modulating bits and power in each subcarrier for a multicarrier modulation signal according to the signal to noise ratio margin.

According to a second aspect of the embodiments of this application, there is provided a bit allocation apparatus in a multicarrier communication system, including: a determining unit configured to determine a signal to noise ratio margin according to a predefined probability of a maximum clipping noise that can be allowed by the system; and an allocating unit configured to allocate the number of modulating bits and power in each subcarrier for a multicarrier modulation signal according to the signal to noise ratio margin.

According to a third aspect of the embodiments of this application, there is provided a transmitter in a multicarrier communication system, including the bit allocation apparatus as described above.

According to a fourth aspect of the embodiments of this application, there is provided a receiver in a multicarrier communication system, including the bit allocation apparatus as described above.

According to a fifth aspect of the embodiments of this application, there is provided a multicarrier communication system, including the bit allocation apparatus as described above.

According to another aspect of the embodiments of this application, there is provided a computer-readable program, wherein when the program is executed in a bit allocation apparatus of a multicarrier modulation signal, the program enables a computer to carry out the method as described in the first aspect in the bit allocation apparatus.

According to a further aspect of the embodiments of this application, there is provided a storage medium in which a computer-readable program is stored, wherein the computer-readable program enables a computer to carry out the method described in the first aspect in a bit allocation apparatus of a multicarrier modulation signal.

An advantage of the embodiments of this application exists in that by presetting a signal to noise ratio margin for a clipping noise, tolerance of the signal for the clipping noise is increased, burst errors are reduced, and success of forward error correction (FEC) decoding is ensured.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments, and/or in combination with or instead of the features of the other embodiments.

It should be emphasized that the term "comprise/comprising/include/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

An embodiment of this application provides a bit allocation method of a multicarrier modulation signal. According to conventional bit allocation algorithms, in some special bit and power allocation patterns, a burst error may be produced, thereby resulting in an FEC (forward error correction) decoding failure. In this application, by presetting a signal to noise ratio margin for a clipping noise, bit and power allocation patterns are changed, so that a large amount of burst errors will not be produced even if a relatively intense clipping noise occurs, thereby reducing burst errors in a multicarrier communication system, and ensuring success of FEC decoding.

The method, apparatus and system of the embodiments of the present disclosure shall be described below with reference to the accompanying drawings and particular embodiments.

Embodiment 1

Figure 1:
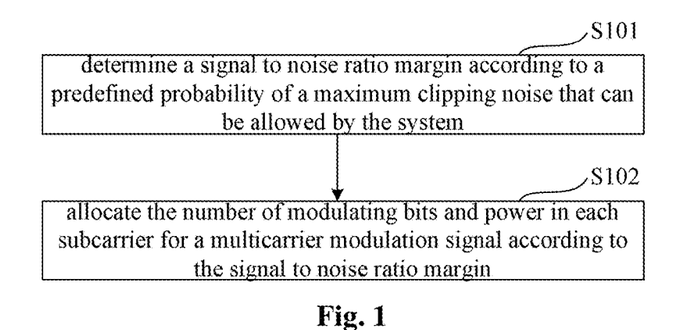
FIG. 1 is a flowchart of a bit allocation method of a multicarrier modulation signal of an implementation according to Embodiment 1.

An embodiment of this application provides a bit allocation method of a multicarrier modulation signal. FIG. 1 is a flowchart of the method. Referring to FIG. 1, the method includes:

step 101: determining a signal to noise ratio margin according to a predefined probability of a maximum clipping noise that can be allowed by the system; and step 102: allocating the number of modulating bits and power in each subcarrier for a multicarrier modulation signal according to the signal to noise ratio margin.

In step 101, the predefined probability of a maximum clipping noise that can be allowed by the system refers to a probability of occurrence to which a maximum clipping noise (clipping distortion) that can be allowed by the system to occur corresponds. A value of such a probability may be predefined; however, this embodiment is not limited thereto.

Figure 2:
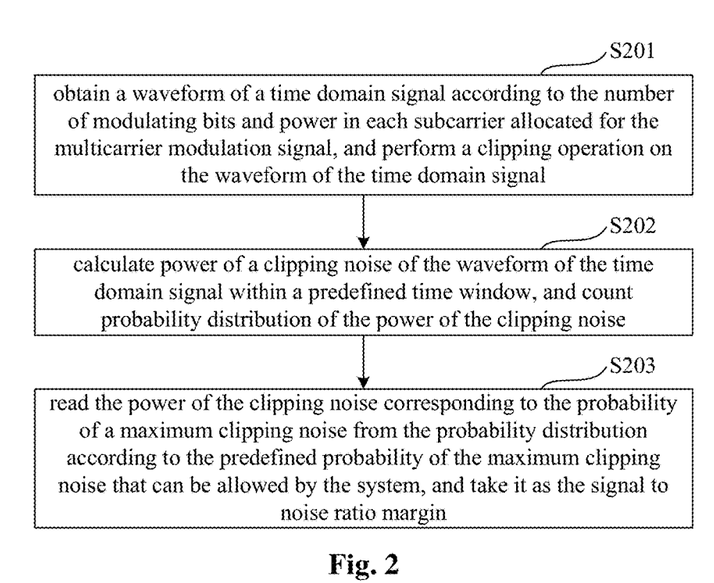
FIG. 2 is a flowchart of a bit allocation method of a multicarrier modulation signal of another implementation according to Embodiment 1.

In an implementation, step 101 may be carried by using the method shown in FIG. 2. As shown in FIG. 2, the method includes:

step 201: obtaining a waveform of a time domain signal according to the number of modulating bits and power in each subcarrier allocated for the multicarrier modulation signal, and performing a clipping operation on the waveform of the time domain signal;

step 202: calculating power of a clipping noise of the waveform of the time domain signal within a predefined time window, and counting probability distribution of the power of the clipping noise; and step 203: reading the power of the clipping noise corresponding to the probability of the maximum clipping noise from the probability distribution according to the predefined probability of the maximum clipping noise that can be allowed by the system, and taking it as the signal to noise ratio margin.

The signal to noise ratio margin can be determined with the method shown in FIG. 2. Hence, in step 102, a new signal to noise ratio of each subcarrier may be determined first according to the signal to noise ratio margin (the read power of the clipping noise) and an original signal to noise ratio of each subcarrier, and then a new number of bits and power are allocated for each subcarrier according to the new signal to noise ratio of each subcarrier and the number of bits to which a rate of the communication system corresponds.

In this implementation, by calculating probability distribution of the clipping noise, in a case where influence of a clipping noise of a certain probability is taken into account, the signal to noise ratio margin is set, the original signal to noise ratio directly measured from the channel is adjusted, and bit allocation is performed based on the adjusted signal to noise ratio, thereby changing bit and power allocation patterns of the subcarriers, and increasing tolerance of the multicarrier modulation signal for the clipping distortion. In this way, a large amount of burst errors will not be produced even if a relatively intense clipping noise occurs, thereby reducing burst errors in a multicarrier communication system, and ensuring success of FEC decoding.

In step 201, the number of modulating bits and power in each subcarrier may be allocated based on a conventional bit allocation algorithm, such as Chow's bit allocation algorithm [P. S. Chow et. al., "A Practical Discrete Multitone Transceiver Loading Algorithm for Data Transmission over Spectrally Shaped Channels", Trans. Comm., vol. 43, no 2, pp 773 (1995)], or other bit allocation algorithms.

In a bit allocation algorithm, the signal to noise ratios of the subcarrier channels (the original signal to noise ratios of the subcarrier channels) need to be used as parameters. The signal to noise ratios obtained via direct measurement at current subcarrier channels may be used for allocation, and e.g. historical average values of the signal to noise ratios of the subcarrier channels may also be used for allocation. The measurement of the signal to noise ratios may be achieved by transmitting sounding signals, etc. However, this implementation is not limited thereto.

The waveform of the time domain signal may be obtained after the allocation of the number of bits and power, and in such a case, a clipping operation for clipping the peak is performed on the waveform of the time domain signal.

In step 202, the time window may be defined according to a certain principle and policy. Generally, an adequately long time window should be taken, so that an obtained result will have a statistical meaning. After the time window is defined, the power of the clipping noise of the waveform of the time domain signal may be calculated within the time window, and the probability distribution of the power of the clipping noise may be counted for the calculated power of the clipping noise.

Figure 3:
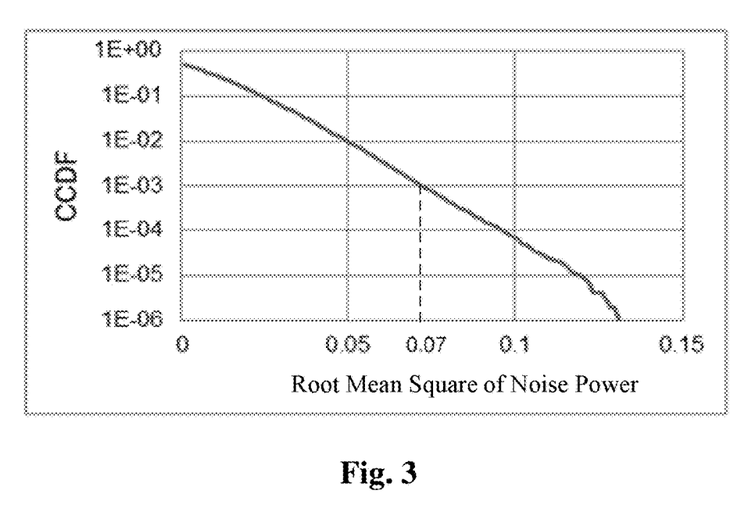
FIG. 3 is a schematic diagram of distribution of CCDF of different noise power according to Embodiment 1.

The counted probability distribution may be a complementary cumulative distribution function (CCDF), such as a CCDF distribution diagram shown in FIG. 3, in which the signal power is 1, the horizontal axis denotes a root mean square of the noise power, and the vertical axis denotes a corresponding CCDF value obtained through counting.

In step 203, the corresponding power of the noise is read from the probability distribution according to the predefined probability of the maximum clipping noise that can be allowed by the system, and is taken as the signal to noise ratio margin. Particularly, in FIG. 3, for example, if the predefined probability is 1E-3, the root mean square of the noise power corresponding to the CCDF value 1E-3 is 0.07, hence, Pclip=$0.07^2$ is taken as the signal to noise ratio margin.

After the signal to noise ratio margin is determined, the original signal to noise ratio of each subcarrier may be adjusted according to the signal to noise ratio margin, so as to obtain an adjusted new signal to noise ratio. In this embodiment, the original signal to noise ratio of each subcarrier may be obtained in the manner described in step 201.

The new signal to noise ratio of each subcarrier may be obtained by using Formula (1) below:

$$SNR_{m,i} = \frac{1}{\frac{1}{SNR_{o,i}} + \alpha P_{clip}};\qquad(1)$$

in this formula, i is an index of a subcarrier, assuming that the multicarrier communication system has totally k subcarriers, i=1, 2, . . . k, $SNR_{o,i}$ denotes an original signal to noise ratio of an i-th subcarrier, $SNR_{m,i}$ denotes a new signal to noise ratio of the i-th subcarrier, the units of both $SNR_{o,i}$ and $SNR_{m,i}$ are both linear units (not dB), and a is a correction coefficient of the signal to noise ratio margin, which may be set according to an actual demand of the system.

Figure 4:
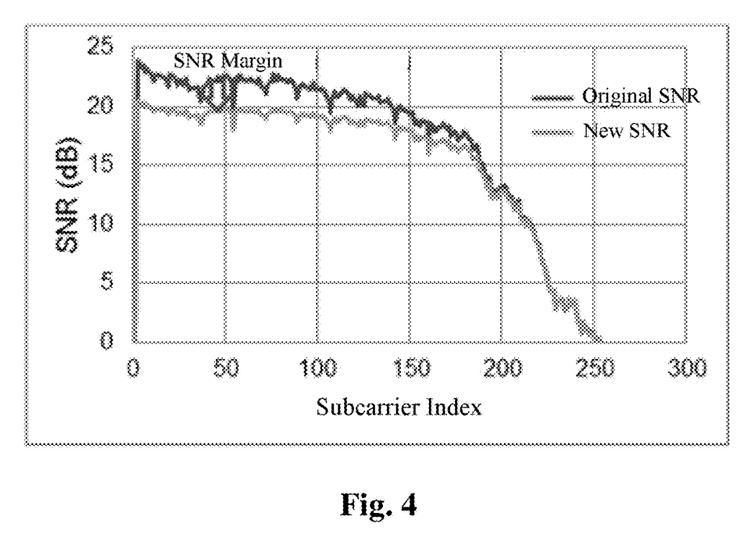
FIG. 4 is a schematic diagram of comparison of an original signal to noise ratio and a new signal to noise ratio for each subcarrier according to Embodiment 1.

FIG. 4 shows distribution of the original signal to noise ratio and the new signal to noise ratio of each subcarrier, in which the horizontal axis denotes an index of the subcarrier, the vertical axis denotes a signal to noise ratio (with a unit of dB), and the two curves in the figure respectively denote the original signal to noise ratio and the adjusted new signal to noise ratio of each subcarrier when the probability of the clipping noise is 1e-3. It can be seen there from that the signal to noise ratio margin is used to adjust the original signal to noise ratio, so as to obtain the new signal to noise ratio.

Figure 5:
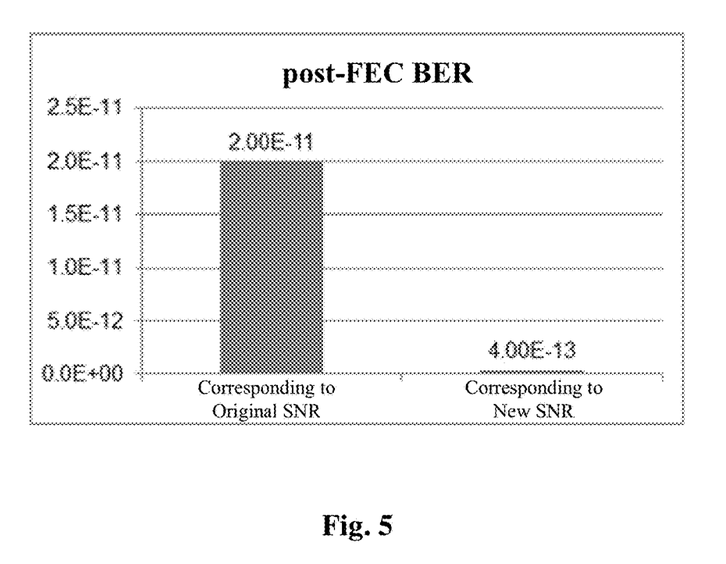
FIG. 5 is a schematic diagram of comparison of bit error rates after bit allocation are performed by using the original signal to noise ratio and the new signal to noise ratio according to Embodiment 1.

FIG. 5 shows a schematic diagram of comparison of bit error rates (BERs) after bit allocation are performed by using the original signal to noise ratio and the new signal to noise ratio. It can be seen from FIG. 5 that the BER after the bit allocation is performed by using the new signal to noise ratio is much lower than the BER after the bit allocation is performed by using the original signal to noise ratio.

With the bit allocation method of this embodiment, a large amount of burst errors will not be produced even if a relatively intense clipping noise occurs, thereby reducing burst errors in a multicarrier communication system, and ensuring success of FEC decoding.

Embodiment 2

An embodiment of the present disclosure further provides a bit allocation apparatus of a multicarrier modulation signal. As principles of the apparatus for solving problems is similar to that of the method according to Embodiment 1, the implementation of the method according to Embodiment 1 may be referred to for implementation of the apparatus, with identical contents being not going to be described herein any further.

Figure 6:
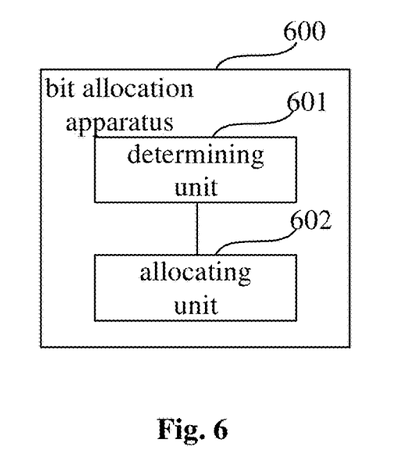
FIG. 6 is a schematic diagram of a bit allocation apparatus of a multicarrier modulation signal of an implementation according to Embodiment 2.

FIG. 6 is a schematic diagram of a structure of the bit allocation apparatus of a multicarrier modulation signal according to this embodiment. Referring to FIG. 6, the apparatus 600 includes: a determining unit 601 and an allocating unit 602. In this embodiment, the determining unit 601 is configured to determine a signal to noise ratio margin according to a predefined probability of a maximum clipping noise that can be allowed by the system, and the allocating unit 602 is configured to allocate the number of modulating bits and power in each subcarrier for a multicarrier modulation signal according to the signal to noise ratio margin.

Figure 7:
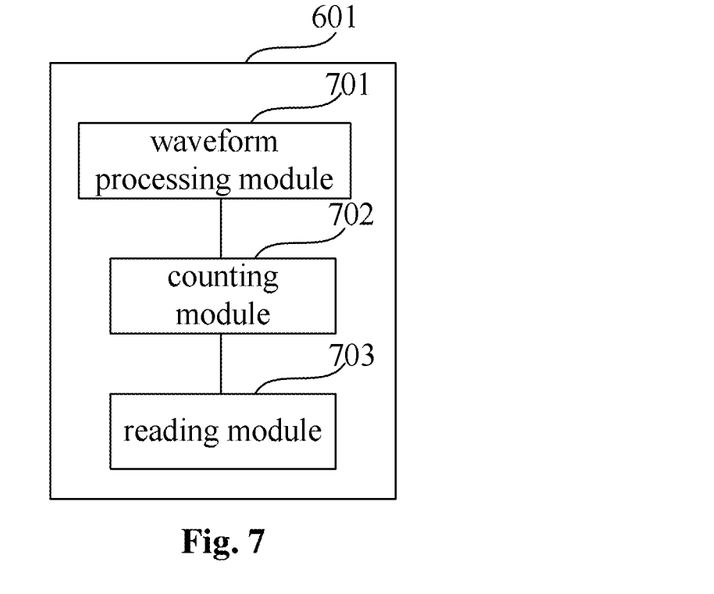
FIG. 7 is a schematic diagram of a determining unit of the bit allocation apparatus according to an implementation of Embodiment 2.

In an implementation, as shown in FIG. 7, the determining unit 601 includes: a waveform processing module 701, a counting module 702 and a reading module 703.

In this implementation, the waveform processing module 701 is configured to obtain a waveform of a time domain signal according to the number of modulating bits and power in each subcarrier allocated for the multicarrier modulation signal, and perform a clipping operation on the waveform of the time domain signal, the counting module 702 is configured to calculate power of a clipping noise of the waveform of the time domain signal within a predefined time window, and count probability distribution of the power of the clipping noise, and the reading module 703 is configured to read power of a clipping noise corresponding to a probability of a maximum clipping noise from the probability distribution according to the predefined probability of the maximum clipping noise that can be allowed by the system, and take it as the signal to noise ratio margin.

Figure 8:
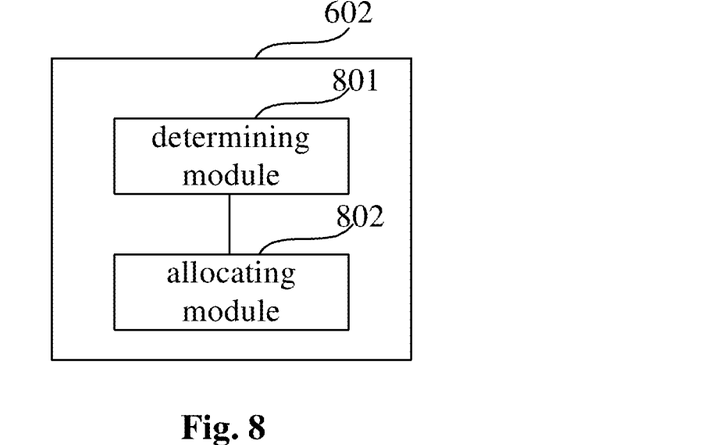
FIG. 8 is a schematic diagram of an allocating unit of the bit allocation apparatus according to an implementation of Embodiment 2.

In an implementation, as shown in FIG. 8, the allocating unit 602 includes: a determining module 801 and an allocating module 802.

In this implementation, the determining module 801 is configured to determine a new signal to noise ratio of each subcarrier according to the read power of the clipping noise and an original signal to noise ratio of each subcarrier, and the allocating module 802 is configured to allocate a new number of bits and power for each subcarrier according to the new signal to noise ratio of each subcarrier and the number of bits to which a rate of the communication system corresponds.

In this implementation, the new signal to noise ratio of each subcarrier may be:

$$SNR_{m,i} = \frac{1}{\frac{1}{SNR_{o,i}} + \alpha P_{clip}};$$

in this formula, i is an index of a subcarrier, assuming that the multicarrier communication system has totally k subcarriers, i=1, 2, . . . k, $SNR_{o,i}$ denotes an original signal to noise ratio of an i-th subcarrier, $SNR_{m,i}$ denotes a new signal to noise ratio of the i-th subcarrier, the units of both $SNR_{o,i}$ and $SNR_{m,i}$ are both linear units (not dB), and α is a correction coefficient of the signal to noise ratio margin.

With the bit allocation apparatus of this embodiment, a large amount of burst errors will not be produced even if a relatively intense clipping noise occurs, thereby reducing burst errors in a multicarrier communication system, and ensuring success of FEC decoding.

Embodiment 3

An embodiment of the present disclosure further provides a transmitter, such as a base station in a multicarrier communication system, the transmitter including the bit allocation apparatus of a multicarrier modulation signal according to Embodiment 2.

Figure 9:
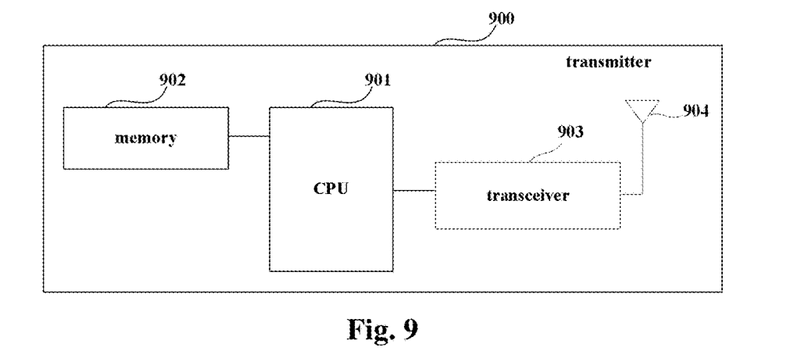
FIG. 9 is a schematic diagram of a structure of a transmitter according to Embodiment 3.

FIG. 9 is a schematic diagram of a structure of the transmitter of this embodiment. As shown in FIG. 9, the transmitter 900 may include a central processing unit (CPU) 901 and a memory 902, the memory 902 being coupled to the central processing unit 901. The memory 902 may store various data, and furthermore, store programs for information processing, and execute the programs under control of the central processing unit 901.

In an implementation, the functions of the bit allocation apparatus according to Embodiment 2 may be integrated into the central processing unit 901. In this implementation, the central processing unit 901 may be configured to determine a signal to noise ratio margin according to a predefined probability of a maximum clipping noise that can be allowed by the system, and allocate the number of modulating bits and power in each subcarrier for a multicarrier modulation signal according to the signal to noise ratio margin.

Alternatively, the central processing unit 901 may further be configured to obtain a waveform of a time domain signal according to the number of modulating bits and power in each subcarrier allocated for the multicarrier modulation signal, and perform a clipping operation on the waveform of the time domain signal; calculate power of a clipping noise of the waveform of the time domain signal within a predefined time window, and count probability distribution of the power of the clipping noise; read power of a clipping noise corresponding to a probability of a maximum clipping noise from the probability distribution according to the predefined probability of the maximum clipping noise that can be allowed by the system, and take it as the signal to noise ratio margin; determine a new signal to noise ratio of each subcarrier according to the read power of the clipping noise and an original signal to noise ratio of each subcarrier; and allocate a new number of bits and power for each subcarrier according to the new signal to noise ratio of each subcarrier and the number of bits to which a rate of the communication system corresponds.

In this implementation, the new signal to noise ratio of each subcarrier may be:

$$SNR_{m,i} = \frac{1}{\frac{1}{SNR_{o,i}} + \alpha P_{clip}};$$

in this formula, i is an index of a subcarrier, assuming that the multicarrier communication system has totally k subcarriers, i=1, 2, . . . k, $SNR_{o,i}$ denotes an original signal to noise ratio of an i-th subcarrier, $SNR_{m,i}$ denotes a new signal to noise ratio of the i-th subcarrier, the units of both $SNR_{o,i}$ and $SNR_{m,i}$ are both linear units (not dB), and a is a correction coefficient of the signal to noise ratio margin.

In another implementation, the bit allocation apparatus according to Embodiment 2 and the central processing unit 901 may be configured separately. For example, the bit allocation apparatus may be configured as a chip connected to the central processing unit 901, with its functions being realized under control of the central processing unit 901.

Furthermore, as shown in FIG. 9, the transmitter 900 may further include a transceiver 903, and an antenna 904, etc.; where, the functions of the above components may be similar to the prior art, and shall not be described herein any further. It should be noted that the transmitter 900 does not necessarily include all the components shown in FIG. 9; furthermore, the transmitter 900 may include components not shown in FIG. 9, and the prior art may be referred to.

The transmitter according to the embodiment of this application employs the bit allocation apparatus according to the embodiment of this application. In this embodiment, by setting a signal to noise ratio margin, a large amount of burst errors will not be produced even if a relatively intense clipping noise occurs, thereby reducing burst errors in a multicarrier communication system, and ensuring success of FEC decoding.

Embodiment 4

An embodiment of the present disclosure further provides a receiver, such as UE in a multicarrier communication system, the receiver including the bit allocation apparatus of a multicarrier modulation signal according to Embodiment 2.

Figure 10:
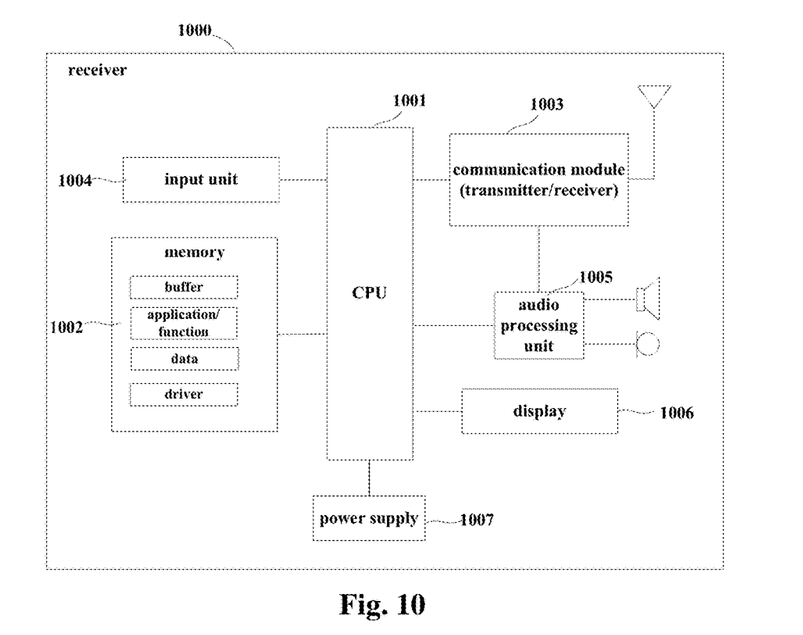
FIG. 10 is a schematic diagram of a structure of a receiver according to Embodiment 4.

FIG. 10 is a schematic diagram of a structure of the receiver of this embodiment. As shown in FIG. 10, the receiver 1000 may include a central processing unit (CPU) 1001 and a memory 1002, the memory 1002 being coupled to the central processing unit 1001. It should be noted that this figure is exemplary only, and other types of structures may be used to supplement or replace this structure for the realization of telecommunications functions or other functions.

In an implementation, the functions of the bit allocation apparatus according to Embodiment 2 may be integrated into the central processing unit 1001. In this implementation, the central processing unit 1001 may be configured to determine a signal to noise ratio margin according to a predefined probability of a maximum clipping noise that can be allowed by the system, and allocate the number of modulating bits and power in each subcarrier for a multicarrier modulation signal according to the signal to noise ratio margin.

Alternatively, the central processing unit 1001 may further be configured to obtain a waveform of a time domain signal according to the number of modulating bits and power in each subcarrier allocated for the multicarrier modulation signal, and perform a clipping operation on the waveform of the time domain signal; calculate power of a clipping noise of the waveform of the time domain signal within a predefined time window, and count probability distribution of the power of the clipping noise; read power of a clipping noise corresponding to a probability of a maximum clipping noise from the probability distribution according to the predefined probability of the maximum clipping noise that can be allowed by the system, and take it as the signal to noise ratio margin; determine a new signal to noise ratio of each subcarrier according to the read power of the clipping noise and an original signal to noise ratio of each subcarrier; and allocate a new number of bits and power for each subcarrier according to the new signal to noise ratio of each subcarrier and the number of bits to which a rate of the communication system corresponds.

In this implementation, the new signal to noise ratio of each subcarrier may be:

$$SNR_{m,i} = \frac{1}{\frac{1}{SNR_{o,i}} + \alpha P_{clip}};$$

in this formula, i is an index of a subcarrier, assuming that the multicarrier communication system has totally k subcarriers, i=1, 2, ... k, $SNR_{o,i}$ denotes an original signal to noise ratio of an i-th subcarrier, $SNR_{m,i}$ denotes a new signal to noise ratio of the i-th subcarrier, the units of both $SNR_{o,i}$ and $SNR_{m,i}$ are both linear units (not dB), and a is a correction coefficient of the signal to noise ratio margin.

In another implementation, the bit allocation apparatus and the central processing unit 1001 may be configured separately. For example, the bit allocation apparatus may be configured as a chip connected to the central processing unit 1001, with its functions being realized under control of the central processing unit 1001.

Furthermore, as shown in FIG. 10, the receiver 1000 may further include a communication module 1003, an input unit 1004, an audio processing unit 1005, a display 1006, and a power supply 1007. It should be noted that the receiver 1000 does not necessarily include all the components shown in FIG. 10; furthermore, the receiver 1000 may include components not shown in FIG. 10, and the prior art may be referred to.

As shown in FIG. 10, the central processing unit 1001 is sometimes referred to as a controller or control, and may include a microprocessor or other processor devices and/or logic devices. The central processing unit 1001 receives input and controls operations of each components of the receiver 1000.

In this embodiment, the memory 1002 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 1001 may execute the program stored in the memory 1002, so as to realize information storage or processing, etc. Functions of other components are similar to those of the prior art, which shall not be described herein any further. The components of the receiver 1000 may be realized by specific hardware, firmware, software, or any combination thereof, without departing from the scope of the present disclosure.

The receiver according to the embodiment of this application employs the bit allocation apparatus according to the embodiment of this application. In this embodiment, by setting a signal to noise ratio margin, a large amount of burst errors will not be produced even if a relatively intense clipping noise occurs, thereby reducing burst errors in a multicarrier communication system, and ensuring success of FEC decoding.

Embodiment 5

Figure 11:
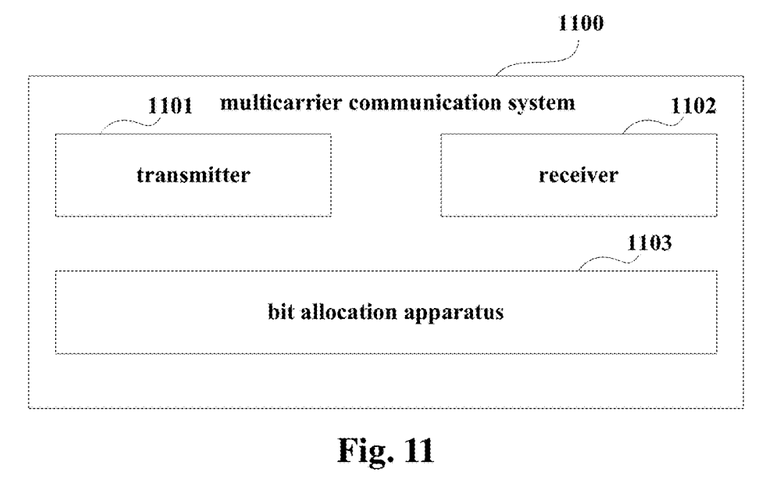
FIG. 11 is a schematic diagram of a structure of a multicarrier communication system according to Embodiment 5.

An embodiment of the present disclosure further provides a multicarrier communication system. FIG. 11 is a schematic diagram of a structure of the system. As shown in FIG. 11, the communication system 1100 includes transmitter 1101, a receiver 1102 and a bit allocation apparatus 1103; wherein, the bit allocation apparatus 1103 may be carried out by the bit allocation apparatus according to Embodiment 2, the contents of which being incorporated herein, and being not going to be described herein any further.

The multicarrier communication system according to the embodiment of this application employs the bit allocation apparatus according to the embodiment of this application. In this embodiment, by setting a signal to noise ratio margin, a large amount of burst errors will not be produced even if a relatively intense clipping noise occurs, thereby reducing burst errors in a multicarrier communication system, and ensuring success of FEC decoding.

An embodiment of the present disclosure further provides a computer-readable program, wherein when the program is executed in a bit allocation apparatus, the program enables a computer to carry out the method according to Embodiment 1 in the bit allocation apparatus.

An embodiment of the present disclosure further provides a storage medium in which a computer-readable program is stored, wherein the computer-readable program enables a computer to carry out the method according to Embodiment 1 in a bit allocation apparatus.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For the implementation of the present disclosure containing the above embodiments, following supplements are further disclosed.

Supplement 1. A bit allocation apparatus in a multicarrier communication system, including:

a determining unit configured to determine a signal to noise ratio margin according to a predefined probability of a maximum clipping noise that can be allowed by the system; and an allocating unit configured to allocate the number of modulating bits and power in each subcarrier for a multicarrier modulation signal according to the signal to noise ratio margin.

Supplement 2. The bit allocation apparatus according to supplement 1, wherein the determining unit includes:

a waveform processing module configured to obtain a waveform of a time domain signal according to the number of modulating bits and power in each subcarrier allocated for the multicarrier modulation signal, and perform a clipping operation on the waveform of the time domain signal;

a counting module configured to calculate power of a clipping noise of the waveform of the time domain signal within a predefined time window, and count probability distribution of the power of the clipping noise; and a reading module configured to read power of a clipping noise corresponding to a probability of a maximum clipping noise from the probability distribution according to the predefined probability of the maximum clipping noise that can be allowed by the system, and take it as the signal to noise ratio margin.

Supplement 3. The bit allocation apparatus according to supplement 2, wherein the allocating unit includes:

a determining module configured to determine a new signal to noise ratio of each subcarrier according to the read power of the clipping noise and an original signal to noise ratio of each subcarrier; and an allocating module configured to allocate a new number of bits and power for each subcarrier according to the new signal to noise ratio of each subcarrier and the number of bits to which a rate of the communication system corresponds.

Supplement 4. The bit allocation apparatus according to supplement 3, wherein the new signal to noise ratio of each subcarrier is:

$$SNR_{m,i} = \frac{1}{\frac{1}{SNR_{o,i}} + \alpha P_{clip}};$$

where, i is an index of a subcarrier, i=1, 2, . . . k, k being the number of the subcarriers, $P_{clip}$ is the signal to noise ratio margin, $SNR_{o,i}$ is an original signal to noise ratio of an i-th subcarrier, $SNR_{m,i}$ is a new signal to noise ratio of the i-th subcarrier, and a is a correction coefficient of the signal to noise ratio margin.

Supplement 5. A transmitter in a multicarrier communication system, including a bit allocation apparatus, the bit allocation apparatus being configured to:

determine a signal to noise ratio margin according to a predefined probability of a maximum clipping noise that can be allowed by the system; and allocate the number of modulating bits and power in each subcarrier for a multicarrier modulation signal according to the signal to noise ratio margin.

Supplement 6. The transmitter according to supplement 5, wherein the bit allocation apparatus is further configured to:

obtain a waveform of a time domain signal according to the number of modulating bits and power in each subcarrier allocated for the multicarrier modulation signal, and perform a clipping operation on the waveform of the time domain signal;

calculate power of a clipping noise of the waveform of the time domain signal within a predefined time window, and count probability distribution of the power of the clipping noise; and read the power of the clipping noise corresponding to the probability of a maximum clipping noise from the probability distribution according to the predefined probability of the maximum clipping noise that can be allowed by the system, and take it as the signal to noise ratio margin.

Supplement 7. The transmitter according to supplement 6, wherein the bit allocation apparatus is further configured to:

determine a new signal to noise ratio of each subcarrier according to the read power of the clipping noise and an original signal to noise ratio of each subcarrier; and allocate a new number of bits and power for each subcarrier according to the new signal to noise ratio of each subcarrier and the number of bits to which a rate of the communication system corresponds.

Supplement 8. The transmitter according to supplement 7, wherein the new signal to noise ratio of each subcarrier is:

$$SNR_{m,i} = \frac{1}{\frac{1}{SNR_{o,i}} + \alpha P_{clip}};$$

where, i is an index of a subcarrier, i=1, 2, . . . k, k being the number of the subcarriers, $P_{clip}$ is the signal to noise ratio margin, $SNR_{o,i}$ is an original signal to noise ratio of an i-th subcarrier, $SNR_{m,i}$ is a new signal to noise ratio of the i-th subcarrier, and a is a correction coefficient of the signal to noise ratio margin.

Supplement 9. A receiver in a multicarrier communication system, including a bit allocation apparatus, the bit allocation apparatus being configured to:

determine a signal to noise ratio margin according to a predefined probability of a maximum clipping noise that can be allowed by the system; and allocate the number of modulating bits and power in each subcarrier for a multicarrier modulation signal according to the signal to noise ratio margin.

Supplement 10. The receiver according to supplement 9, wherein the bit allocation apparatus is further configured to:

obtain a waveform of a time domain signal according to the number of modulating bits and power in each subcarrier allocated for the multicarrier modulation signal, and perform a clipping operation on the waveform of the time domain signal;

calculate power of a clipping noise of the waveform of the time domain signal within a predefined time window, and count probability distribution of the power of the clipping noise; and read the power of the clipping noise corresponding to the probability of a maximum clipping noise from the probability distribution according to the predefined probability of the maximum clipping noise that can be allowed by the system, and take it as the signal to noise ratio margin.

Supplement 11. The receiver according to supplement 10, wherein the bit allocation apparatus is further configured to:

determine a new signal to noise ratio of each subcarrier according to the read power of the clipping noise and an original signal to noise ratio of each subcarrier; and allocate a new number of bits and power for each subcarrier according to the new signal to noise ratio of each subcarrier and the number of bits to which a rate of the communication system corresponds.

Supplement 12. The receiver according to supplement 11, wherein the new signal to noise ratio of each subcarrier is:

$$SNR_{m,i} = \frac{1}{\frac{1}{SNR_{o,i}} + \alpha P_{clip}};$$

where, i is an index of a subcarrier, i=1, 2, . . . k, k being the number of the subcarriers, $P_{clip}$ is the signal to noise ratio margin, $SNR_{o,i}$ is an original signal to noise ratio of an i-th subcarrier, $SNR_{m,i}$ is a new signal to noise ratio of the i-th subcarrier, and a is a correction coefficient of the signal to noise ratio margin.

The invention claimed is:

1. A bit allocation apparatus in a multicarrier communication system, comprising:
   a determining unit configured to determine a signal to noise ratio margin according to a predefined probability of a maximum clipping noise allowed by the multicarrier communication system; and
   an allocating unit configured to allocate a number of modulating bits and power in each subcarrier for a multicarrier modulation signal according to the signal to noise ratio margin,
   wherein the determining unit comprises:
      a waveform processing module configured to obtain a waveform of a time domain signal according to the number of modulating bits and power in each subcarrier allocated for the multicarrier modulation signal, and perform a clipping operation on the waveform of the time domain signal;
      a calculating module configured to calculate power of clipping noise of the waveform of the time domain signal within a predefined time window, and calculate a probability distribution of the power of the clipping noise; and
      a reading module configured to read maximum power of clipping noise corresponding to a probability of a maximum clipping noise from the probability distribution according to the predefined probability of the maximum clipping noise allowed by the system, and set the maximum power as the signal to noise ratio margin.

2. The bit allocation apparatus according to claim 1, wherein the allocating unit comprises:
   a determining module configured to determine a new signal to noise ratio of each subcarrier according to the read maximum power of the clipping noise and an original signal to noise ratio of each subcarrier; and
   an allocating module configured to allocate a new number of bits and new power for each subcarrier according to the new signal to noise ratio of each subcarrier and a number of bits to which a rate of the multicarrier communication system corresponds.

3. The bit allocation apparatus according to claim 2, wherein the new signal to noise ratio of each subcarrier is:

$$SNR_{m,i} = \frac{1}{\frac{1}{SNR_{o,i}} + \alpha P_{clip}};$$

where, i is an index of a subcarrier, i=1, 2, . . . k, k being the number of the subcarriers, $P_{clip}$ is the signal to noise ratio margin, $SNR_{o,i}$ is the original signal to noise ratio of an i-th subcarrier, $SNR_{m,i}$ is the new signal to noise ratio of the i-th subcarrier, and a is a correction coefficient of the signal to noise ratio margin.

4. A transmitter in a multicarrier communication system, comprising a bit allocation apparatus, the bit allocation apparatus being configured to:
   determine a signal to noise ratio margin according to a predefined probability of a maximum clipping noise allowed by the multicarrier communication system; and
   allocate a number of modulating bits and power in each subcarrier for a multicarrier modulation signal according to the signal to noise ratio margin,
   wherein the bit allocation apparatus is further configured to:
      obtain a waveform of a time domain signal according to the number of modulating bits and power in each subcarrier allocated for the multicarrier modulation signal, and perform a clipping operation on the waveform of the time domain signal;
      calculate power of clipping noise of the waveform of the time domain signal within a predefined time window, and calculate a probability distribution of the power of the clipping noise; and
      read the maximum power of the clipping noise corresponding to the probability of a maximum clipping noise from the probability distribution according to the predefined probability of the maximum clipping noise allowed by the system, and set the maximum power as the signal to noise ratio margin.

5. The transmitter according to claim 4, wherein the bit allocation apparatus is further configured to:
   determine a new signal to noise ratio of each subcarrier according to the read maximum power of the clipping noise and an original signal to noise ratio of each subcarrier; and
   allocate a new number of bits and new power for each subcarrier according to the new signal to noise ratio of each subcarrier and a number of bits to which a rate of the multicarrier communication system corresponds.

6. The transmitter according to claim 5, wherein the new signal to noise ratio of each subcarrier is:

$$SNR_{m,i} = \frac{1}{\frac{1}{SNR_{o,i}} + \alpha P_{clip}};$$

where, i is an index of a subcarrier, i=1, 2, . . . k, k being the number of the subcarriers, $P_{clip}$ is the signal to noise ratio margin, $SNR_{o,i}$ is the original signal to noise ratio of an i-th subcarrier, $SNR_{m,i}$ is the new signal to noise ratio of the i-th subcarrier, and a is a correction coefficient of the signal to noise ratio margin.

7. A receiver in a multicarrier communication system, comprising a bit allocation apparatus, the bit allocation apparatus being configured to:
   determine a signal to noise ratio margin according to a predefined probability of a maximum clipping noise allowed by the system; and
   allocate a number of modulating bits and power in each subcarrier for a multicarrier modulation signal according to the signal to noise ratio margin wherein the bit allocation apparatus is further configured to:
obtain a waveform of a time domain signal according to the number of modulating bits and power in each subcarrier allocated for the multicarrier modulation signal, and perform a clipping operation on the waveform of the time domain signal;
calculate power of clipping noise of the waveform of the time domain signal within a predefined time window, and calculate probability distribution of the power of the clipping noise; and
read the maximum power of the clipping noise corresponding to the probability of a maximum clipping noise from the probability distribution according to the predefined probability of the maximum clipping noise allowed by the system, and set the maximum power as the signal to noise ratio margin.

8. The receiver according to claim 7, wherein the bit allocation apparatus is further configured to:
determine a new signal to noise ratio of each subcarrier according to the read maximum power of the clipping noise and an original signal to noise ratio of each subcarrier; and
allocate a new number of bits and new power for each subcarrier according to the new signal to noise ratio of each subcarrier and a number of bits to which a rate of the multicarrier communication system corresponds.

9. The receiver according to claim 8, wherein the new signal to noise ratio of each subcarrier is:

$$SNR_{m,i} = \frac{1}{\frac{1}{SNR_{o,i}} + \alpha P_{clip}};$$

where, i is an index of a subcarrier, i=1, 2, ... k, k being the number of the subcarriers, $P_{clip}$ is the signal to noise ratio margin, $SNR_{o,i}$ is the original signal to noise ratio of an i-th subcarrier, $SNR_{m,i}$ is the new signal to noise ratio of the i-th subcarrier, and a is a correction coefficient of the signal to noise ratio margin.

* * * * *